(12) United States Patent
Jarzomski et al.

(10) Patent No.: US 10,663,020 B2
(45) Date of Patent: May 26, 2020

(54) DUAL ROTOR TORQUE GENERATING DEVICES, SYSTEMS, AND METHODS

(71) Applicant: LORD Corporation, Cary, NC (US)

(72) Inventors: Michael Jarzomski, Apex, NC (US); Luca Di Deco, Verona (IT)

(73) Assignee: Lord Corporation, Cleveland, OH (US)

( * ) Notice: Subject to any disclaimer, the term of this patent is extended or adjusted under 35 U.S.C. 154(b) by 319 days.

(21) Appl. No.: 15/556,725

(22) PCT Filed: Mar. 11, 2016

(86) PCT No.: PCT/US2016/022016
§ 371 (c)(1),
(2) Date: Sep. 8, 2017

(87) PCT Pub. No.: WO2016/145316
PCT Pub. Date: Sep. 15, 2016

(65) Prior Publication Data
US 2018/0106311 A1 Apr. 19, 2018

Related U.S. Application Data

(60) Provisional application No. 62/132,155, filed on Mar. 12, 2015.

(51) Int. Cl.
*F16D 57/00* (2006.01)
*B62D 5/00* (2006.01)
*F16D 65/18* (2006.01)

(52) U.S. Cl.
CPC .......... *F16D 57/002* (2013.01); *B62D 5/005* (2013.01); *F16D 65/186* (2013.01)

(58) Field of Classification Search
CPC ...... F16D 57/002; B62D 5/005; H02K 1/141; H02K 1/145; H02K 1/182; H02K 16/04
(Continued)

(56) References Cited

U.S. PATENT DOCUMENTS 5,816,372 A 10/1998 Carlson et al.
6,535,806 B2 3/2003 Millsap et al.
(Continued)

FOREIGN PATENT DOCUMENTS

WO 94/01181 1/1994
WO 03/036120 5/2003

OTHER PUBLICATIONS

Kikuchi, Takehito et al., Design and Development of Cylindrical MR Fluid Brake with Multi-Coil Structure, Journa of System Design and Dynamics, vol. 5, No. 7, 2011, pp. 1471-1484.
(Continued)

*Primary Examiner* — Shawki S Ismail
*Assistant Examiner* — Monica Mata (57) ABSTRACT

Torque generating devices, systems, and/or related methods are disclosed. In one aspect, a torque generating device (100) may include a housing (102), at least one top and one bottom pole (108), at least one side pole (110), at least two rotors (116) for rotating within the housing, a shaft (104) supported by bearings (111), at least a first stator (120) disposed between portions of the at least two rotors (116), magnetically responsive (MR) material disposed within the housing (102) and at least partially surrounding the first stator (120) and the at least two rotors (116), and a coil (112) for generating a magnetic field, wherein an amount of torque generated by the torque generating device (100) increases in proportion to an amount of electrical current supplied to the coil (112). In another aspect, a method of generating torque may include providing a torque generating device (100) and rotating the at least two rotors (116).

18 Claims, 9 Drawing Sheets

(58) Field of Classification Search
USPC .......................................................... 310/114
See application file for complete search history.

(56) References Cited

U.S. PATENT DOCUMENTS

| | | | |
|---|---|---|---|
| 6,550,565 B2 | 4/2003 | Thomas et al. | |
| 6,557,662 B1 | 5/2003 | Andonian et al. | |
| 6,612,392 B2 | 9/2003 | Park et al. | |
| 6,854,573 B2 | 2/2005 | Jolly et al. | |
| 2007/0289837 A1 | 12/2007 | Wheals | |
| 2016/0319924 A1* | 11/2016 | Payne | F16H 41/24 |
| 2017/0363159 A1* | 12/2017 | Meszaros | F16D 37/02 |

OTHER PUBLICATIONS

Lord Corporation, Lord TFD Steering Units Brochure, for Steer-By-Wire Systems, 8 pgs.

\* cited by examiner

DUAL ROTOR TORQUE GENERATING DEVICES, SYSTEMS, AND METHODS

CROSS REFERENCE TO RELATED APPLICATIONS

This application relates to and claims priority to U.S. Provisional Patent Application Ser. No. 62/132,155 filed Mar. 12, 2015, the disclosure of which is incorporated by reference herein in the entirety.

TECHNICAL FIELD

The subject matter herein generally relates to torque generating devices, systems, and methods. The subject matter herein more particularly relates to multi rotor torque generating devices, systems, and methods.

BACKGROUND

Manufacturers of consumer vehicles (e.g., off-road vehicles, construction vehicles, cars, trucks, boats, etc.), machinery, and/or equipment having the ability to steer are looking to replace conventional mechanical steering and/or braking systems with electrical steer-by-wire systems, which are more economical, compact, and energy efficient. In steer-by-wire systems, the mechanical connection from the steering unit to the drive wheels is eliminated and replaced with an electrical solution in which drive wheels may be driven by a hydraulic system or electric actuator. In doing so, the operator may no longer feel the forces of the road, water, etc., through the steering wheel, and must operate the device without sufficient sensory information to maintain precise control of the vehicle or equipment.

To overcome the loss in sensory information from severing the mechanical linkage between the steering wheel and the drive wheels, one conventional solution includes incorporating a magneto-rheological device into the steering system. Magneto-rheological devices for damping and controlling vibration and shock are known to provide variable controlled torques or forces. Such devices may be of the "rotary-acting" or "linear-acting" variety, and may include linear dampers, rotary brakes, and rotary clutches.

In some aspects, magneto-rheological devices incorporated in tactile feedback devices include a housing containing a quantity of magneto-rheological material (e.g., a fluid or dry powder) which generally have soft-magnetic particles dispersed within, a movable member (e.g., piston or rotor) capable of moving through the magneto-rheological material to produce a magnetic field and direct a magnetic flux to desired regions of the controllable magneto-rheological material. Thus, tactile feedback devices are currently used to produce a continuously variable resistive steering torque for tactile feedback and position sensing. Torque may be increased to provide simulated end stops to limit rotational travel or number of turns.

One problem with existing tactile feedback devices is that insufficient torque is provided when systems into which the tactile feedback devices are incorporated have a constrained volume. One strategy for overcoming insufficient torque generation is to increase a diameter of the rotor(s) of the tactile feedback devices. Yet, without increasing the diameter of the overall system, there is no additional capacity available in the system to increase the diameter of individual rotors. Thus, when space and volume constraints are in place, the physical limitations prevent the ability to increase torque.

Accordingly, a need exists for improved torque generating devices, systems, and/or methods, for example, which are operable to generate an increased torque from a compact device. Improved torque generating devices, systems, and methods are advantageously less expensive, more efficient, and dimensionally smaller than commercially available devices, systems, and/or methods.

SUMMARY

Dual rotor torque generating devices, systems, and related methods are provided by this inventive disclosure. In one aspect, a torque generating device is provided. The torque generating device comprises a housing, a shaft, at least one bearing, at least one top pole, at least one bottom pole, at least one side pole, at least two rotors, at least a first stator, a magnetically responsive (MR) material and a coil. The at least two rotors are configured to rotate within the housing. The at least a first stator disposed between the at least two rotors. The MR material is disposed within the housing and at least partially surrounding the first stator and the at least two rotors. The coil configured to generate a magnetic field, wherein an amount of torque generated by the torque generating device increases in proportion to an amount of electrical current supplied to the coil.

In another aspect, a method of generating torque is provided. The comprises the steps of providing a torque generating device having at least a housing, at least two rotors, at least one stator, a coil, and a magnetically responsive (MR) material disposed within the housing and at least partially surrounding the at least one stator and the at least two rotors. The step of rotating the at least two rotors. The step of supplying an electrical current to the coil. The step of generating a magnetic field with the coil, thereby generating a variable torque for opposing rotation of the at least two rotors within the housing, wherein an amount of torque generated by the torque generating device increases in proportion to the quantity of the electrical current supplied to the coil.

DETAILED DESCRIPTION

FIGS. 1A-9 illustrate various aspects, views, and/or features associated with dual rotor torque generating devices, systems, and/or related methods. In some embodiments, dual rotor torque generating devices and systems include tactile feedback devices for use with any number of steer-by-wire, clutching, and/or braking applications. Steer-by-wire applications may include various vehicle steering applications (e.g., cars, trucks, boats, off-road devices, construction vehicles, etc.), fitness equipment applications (e.g., stationary bicycles, rowing machines, etc.), and/or any other type of equipment/machine applications utilizing steering, braking, and/or rotating components (e.g., lawnmowers, tillers, conveyors, shakers, etc.). Devices and systems described herein generate a variable torque upon activation with electrical current for tactile feedback and/or braking applications.

Figure 1A:
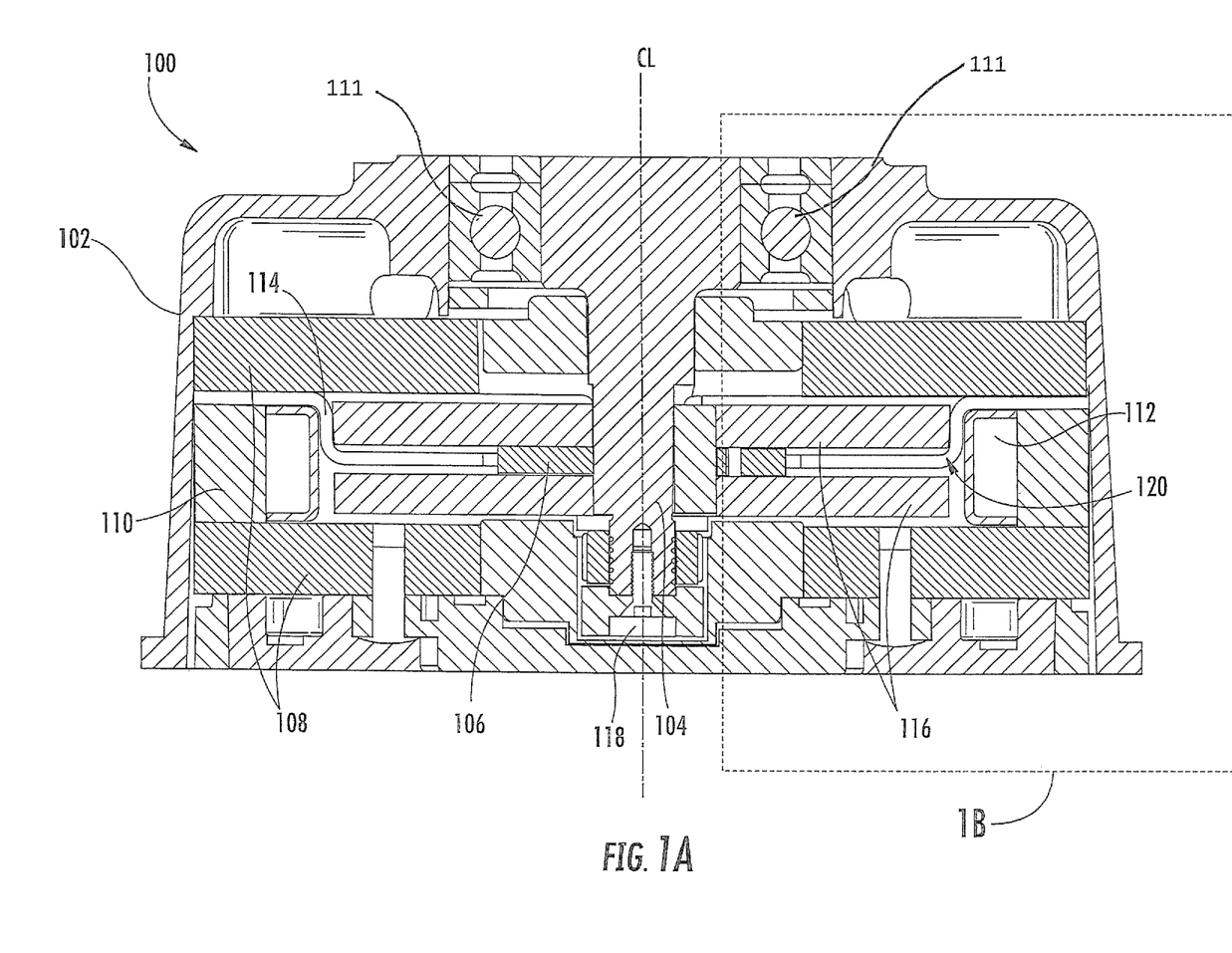
FIG. 1A is a sectional view of an exemplary dual rotor torque generating device according to a first embodiment of the present subject matter.
Figure 1B:
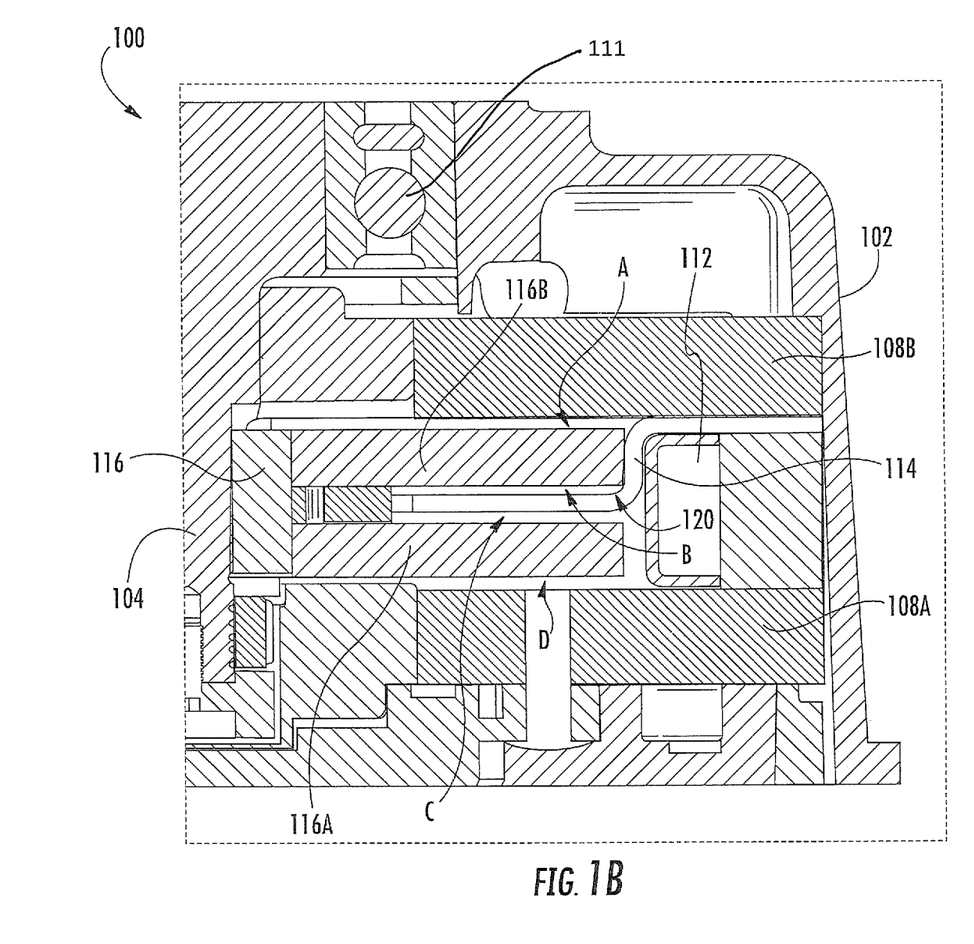
FIG. 1B is a detail sectional view of at least two rotors and at least a first stator of the dual rotor torque generating device according to FIG. 1A.
Figure 2:
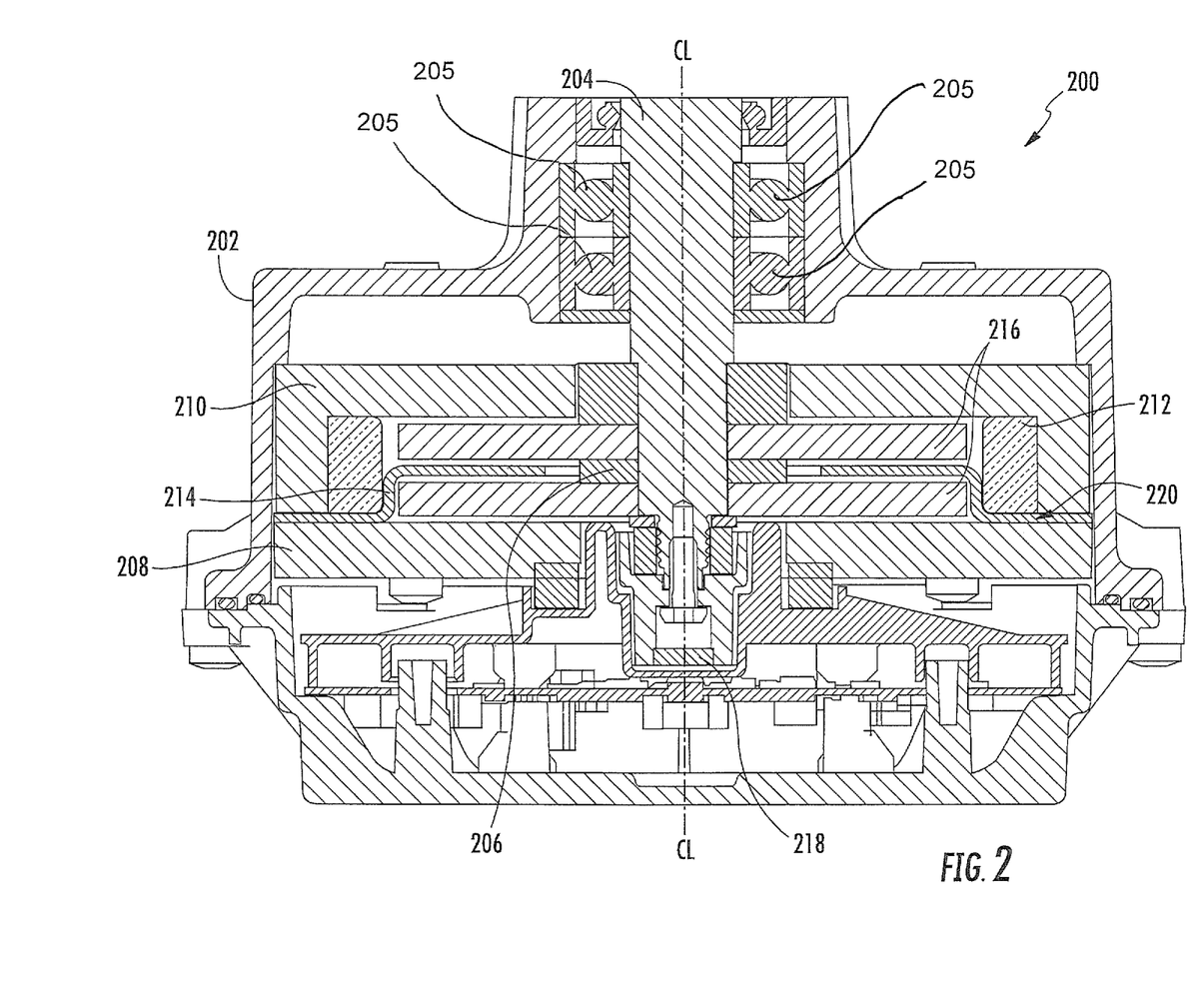
FIG. 2 is a sectional view of an exemplary dual rotor torque generating device according to a second embodiment of the present subject matter.

In some embodiments, dual rotor torque generating devices and systems disclosed herein are configured to generate resistance upon energization of a magnetic field generation component of the device; thereby creating a magnetic field. Conventionally, single rotor torque generating devices include only two shear areas (four shear surfaces) for generating resistance upon application of a magnetic field. However, dual rotor torque generating devices as illustrated in FIGS. 1A-2 generate at least twice as much resistance within the same diameter compared to conventional devices due to the increased number of rotors coupled with an improved stator having an improved stator design disposed between the dual rotors. The improved stator is configured to increase the amount of shear area available to generate resistance to rotation of the rotors during operation. In some embodiments, dual rotor torque generating devices and systems herein include at least four shear areas (e.g., eight shear surfaces) as described herein for generating resistance. By doubling the amount of resistance generated, the amount of torque generated by a single device is also doubled, without needing to increase a diameter of the rotor(s) and/or the electrical power.

FIGS. 1A and 1B illustrate sectional views associated with a first embodiment of an exemplary dual rotor torque generating device, generally designated 100, for generating a variable torque for use in various applications. Referring to FIGS. 1A and 1B, torque generating device 100 includes an outermost housing 102 having one or more chambers disposed therein. Housing 102 may include any suitable material, for example, any metal or metallic material (e.g., aluminum (Al) alloys, steel, cast iron, alloys thereof, etc.), any non-metallic material (e.g., plastic, polymeric, etc.), a magnetic material, a non-magnetic material, and/or any combinations thereof. Sizing of the housing is determined by the torque output required and the available space for torque generating device 100.

Referring to FIGS. 1A and 1B, housing 102 is configured to enclose or house one or more rotating components and a magnetically responsive (MR) material that collectively operate to generate a variable torque within a first working chamber. MR material includes magnetorheological fluid and powder. The variable torque may be transmitted or output to a rotating component (not shown) attached to device 100. For example, variable torque may be transmitted to a steering component (e.g., a steering wheel) for tactile feedback applications, drive wheels for clutching or braking applications, and/or any other components associated with rotating machinery. As configured, device 100 generates a variable torque for providing tactile/sensory feedback for use in non-mechanical (e.g., steer-by-wire) steering applications.

In FIGS. 1A and 1B, housing 102 may enclose or house one or more rotating (e.g., working) components, whereupon opposition to the rotation of the working components is provided using an MR material is configured to generate a variable torque within the first working chamber. One or more optional position control/sensor components for providing optional position sensing may be disposed within a second chamber of housing 102.

Device 100 includes at least two rotors 116 providing a compact dual rotor device configured to increase or improve torque generation. In some embodiments, where an even further increase in torque generation is desired, device 100 may include three or more rotors 116. It will be understood by those skilled in the art that increasing the number of rotors 116 may increase an amount of torque generated by device 100.

Rotors 116 include a magnetic material (e.g., iron, steel, etc.). A shaft 104 may extend through device 100 and connect to portions of rotors 116 for providing rotation thereof. Shaft 104 is generally supported by bearings 111. In some embodiments, rotors 116 rotate about a centerline CL of shaft 104, which may also coincide with a centerline of device 100. Shaft 104 may include a solid or hollow component having any suitable length for use in a variety of steering (e.g., steer-by-wire) and/or braking applications. Optionally, a spacer 106 may be disposed between dual rotors 116 to prevent rotors 116 from contacting a stator 120 disposed therebetween. A drive key can be configured to transmit the torque generated from the rotors 116, top and bottom poles 108 and stator 120 to shaft 104.

In some embodiments, top and bottom poles 108 may be disposed within housing 102. Top and bottom poles 108 may be disposed on either side of the dual rotors 116. Referring to FIG. 1B, a top pole 108B may be disposed above a top rotor 116B and a bottom pole 108A may be disposed below a bottom rotor 116B. The top and bottom poles 108 may be configured such that a gap exists between each top and bottom pole 108 and the rotors 116 (see, e.g., first shear area A and fourth shear area D in FIG. 1B).

In some embodiments, device 100 includes a side pole 110 disposed between top and bottom poles 108. Side pole 110 may include an annular electromagnetic coil 112 within its diameter for generating a magnetic field upon energization or activation of coil 112 with electrical current. Coil 112 may include an electromagnetic magnetic material for inducing an electromagnetic field to generate torque that opposes the rotation of rotors 116. Coil 112 is in communication with an electrical unit (not shown) that may include one or more sensors, power amplifiers, signal conditioners, analog or digital circuitry for employing control algorithms, communications circuitry, as well as other circuitry and like components as will be readily apparent to those of ordinary skill in the art.

In some embodiments, a sensor magnet 118 may be disposed in a portion of housing 102. For example, sensor magnet 118 may include a positioning magnet that is secured to a bottom of rotating shaft 104 for providing feedback to a hall-effect sensor component disposed within the electrical unit (not shown). Magnet 118 and the hall-effect sensor (not shown) may be easily secured to device 100 and easily inspected and replaced, for example, via a screw, connector, or any other connector assembly. Magnet 118 and hall-effect sensor are configured to detect and transmit a position of a rotatable component (e.g., steering component) attached to the rotating shaft 104 of device 100. For example, device 100 may be disposed below a vehicle steering wheel (not shown). As an operator turns the steering wheel, the hall-effect steering sensor magnet 118 may detect and transmit the steering position to a vehicle steering controller (not shown). The steering controller may use information from a variety of vehicle inputs to determine the preferred steering response. Various steering responses may be programmed for generating variable torque for partial or multiple rotations, to generate end-stop control, to generate position detents, etc.

As illustrated in FIGS. 1A and 1B, at least one stator 120 may be disposed between portions of the at least two rotors 116 and substantially shaped or formed around coil 112. As illustrated in FIGS. 1A and 1B, stator 120 is configured as a fixed, center stator having an "s" bend, where a first portion of stator 120 rests or is substantially in contact with a top surface of side pole 110 and a bottom surface of top pole 108B, vertical portion 114 is substantially in contact with a side surface of top rotor 116B, and a second portion of stator 120 is in between the rotors 116. As illustrated in FIG. 2, below, a stator 220 may comprise an alternative "s" bend. Stator 120 may be fixedly held within housing 102 and between portions of the at least two rotors 116 via a non-ferrous connection in order to optimize the magnetic circuit. Alternatively, stator 120 may be clamped between one of the top and bottom poles 108 and side pole 110. Regardless, stator 120 may include a non-linear component having a bent or formed shape, such as forming an "s" bend, where horizontal and vertical portion 114 of stator 120 may be formed about one or more of rotors 116 and coil 112. Vertical portion 114 of stator 120 may be configured as a path of least resistance or a "shorting path" for magnetic flux to pass through. As such, generated magnetic flux will pass through the shorting path and limit the flux passing through at least one of rotors 116 (e.g., top rotor 116B, FIGS. 3A, 3B and 5).

More particularly, rotors 116 may both be activated, although one rotor may increase in torque generation proportionally with regard to the other rotor. For example, device 100 is configured such that the flux path passing through bottom rotor 116A is proportionally limited until the shorting path of stator 120 reaches a saturation point. Until the saturation point is reached, torque generation of bottom rotor 116A will increase at a rate proportional to that of top rotor 116B. However, once the saturation point is reached, then torque generation of both rotors will increase a substantially similar amount. Notably, the flux path passing through the top rotor 116B is not limited by the shorting path and, thus, will be generating torque normally.

Stator 120 may be manufactured via a stamping process to create any geometrically desirably shape, which may also simplify the overall manufacturing process of device 100. Other manufacturing processes and geometries of stator 120 may also be provided. In addition to this, device 100 may include two or more stators 120, which may additionally require more rotors 116 and/or coils 112 to be vertically stacked within housing 102.

Notably, the shape of stator 120 and its disposition between dual rotors 116 provides additional shear surfaces for generating torque. As illustrated in FIG. 1B, at least four shear areas A-D (e.g., each area having two shear surfaces) are formed and/or provided. For example, a first shear area A may be formed between a surface of a top pole 108B and a first surface of a top rotor 116B, a second shear area B may be formed between a first surface of stator 120 and a second, opposing surface of top rotor 116B, a third shear area C may be formed between a second, opposing surface of stator 120 and a first surface of a bottom rotor 116A, and a fourth shear area D may be formed between a surface of a bottom pole 108A and a second, opposing surface of bottom rotor 116A. Thus, when magnetic flux is conveyed through MR material, resistance is generated via contact with at least eight shear surfaces.

Stator 120, top and bottom poles 108, side pole 110, rotors 116 and coil 112 collectively form a magnetic field generator whereby coil 112 generates and conveys a magnetic field or flux path through a MR material for generating a variable torque that opposes dual rotors 116. MR material is disposed about portions of rotor 116, for example, on opposing sides and all around rotors 116, such that MR material may be disposed proximate to the gaps defining shear areas A-D. MR material may be contained within a portion of the working chambers and in contact with stator 120 and at least two rotors 116.

In some embodiments, MR material includes any material that is responsive to and/or actuated by a magnetic field. MR material may include soft-magnetic or magnetizable particles dispersed within a carrier material (e.g., a liquid or gas). In some embodiments, MR material includes a dry MR powder including magnetizable particles that are not dispersed within a liquid or oil carrier. The magnetizable particles of material may include carbonyl iron, stainless steel, and/or any other magnetic material having various shapes, not limited to a spherical shape. MR material may include an MR powder having magnetizable particles of any suitable size, for example, particles having a mean diameter of approximately 0.1 μm to approximately 500 μm, and any size(s) and/or range of size(s) therebetween. In some embodiments, MR material is any MR material readily commercially available in various formulations from LORD Corporation of Cary, N.C.

FIG. 2 illustrates a sectional view associated with a second embodiment of an exemplary dual rotor torque generating device, generally designated 200, for generating a variable torque for use in various applications. Referring to FIG. 2, torque generating device 200 includes parts similar to those in FIGS. 1A and 1B, and includes a housing 202, a shaft 204, at least one bearing 205, a spacer 206, a bottom pole 208, an integrated top pole 210, a coil 212, a stator 220, a vertical portion 114 of stator 220, dual rotors 216, and a magnet 218. Top pole 210 is formed such that it comprises an 'L' shape, with a horizontal portion that is parallel to bottom pole 208 and a vertical portion substantially perpendicular to and extending towards bottom pole 208. The vertical portion of top pole 210 may be configured as an annular core comprising coil 212. Accordingly, torque generating device 200 can be configured such that the top pole 108B and side pole 110 of FIGS. 1A-B are integrally formed.

Additionally, FIG. 2 illustrates a stator 220, where a first portion of stator 220 rests or is substantially in contact with a top surface of bottom pole 208 and bottom surfaces of coil 212 and top pole 210, vertical portion 214 is substantially in contact with a side surface of bottom rotor 216 and a side surface of coil 212, and a second portion of stator 220 is in between rotors 220. Stator 220 may be fixedly held in this manner within housing 202 and between portions of the at least two rotors 216 via a non-ferrous connection in order to optimize the magnetic circuit. Alternatively, stator 220 may be clamped between bottom pole 208 and integrated top pole 210. Regardless of the configuration, vertical portion 214 of stator 220 may be configured as a path of least resistance or a "shorting path" for magnetic flux to pass through. As such, generated magnetic flux will pass through the shorting path and limit the flux passing through at least one of rotors 216 (e.g., bottom rotor 216).

Figure 3A:
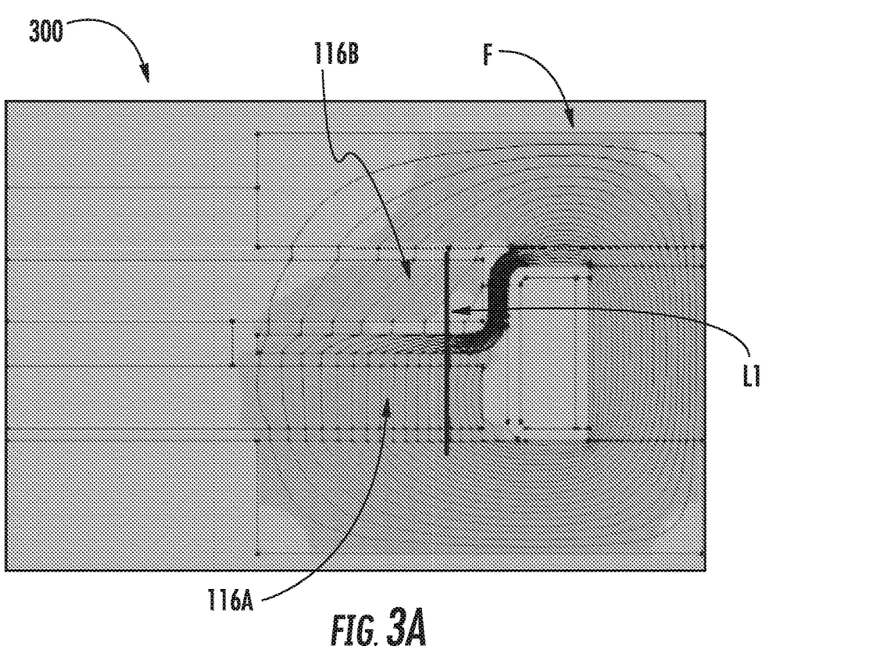
FIGS. 3A-3B are flux density plots at various current levels associated with a dual rotor torque generating device or system according to one embodiment of the present subject matter.
Figure 3B:
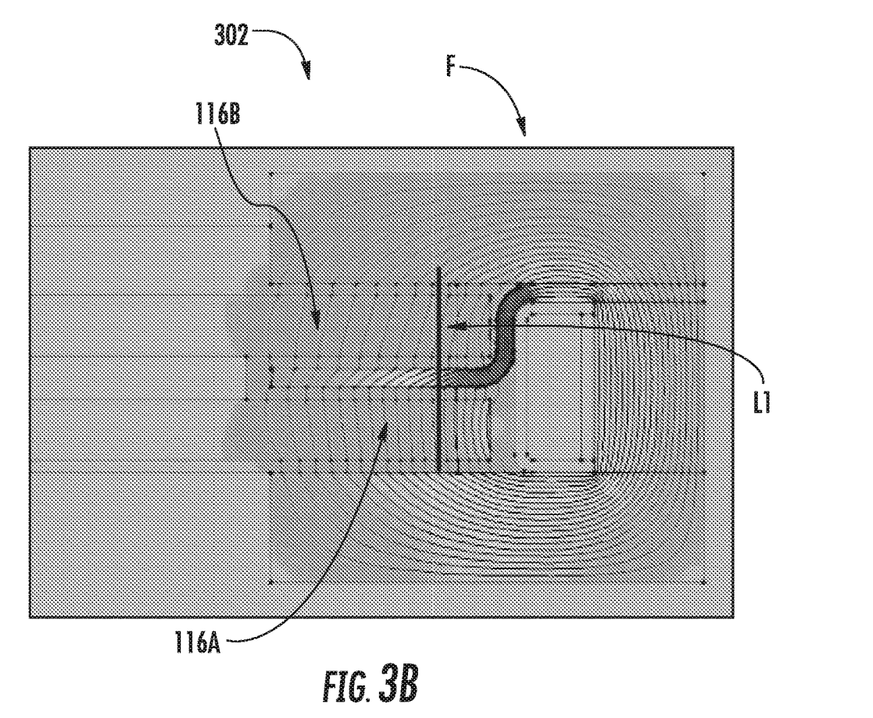

FIGS. 3A-3B schematically illustrate flux density plots of magnetic flux paths through shear areas A-D of device 100, illustrated in FIGS. 1A and 1B, after coil 112 is energized. FIG. 3A illustrates the magnetic flux path when a current supplied to coil 112 is at 0.1 Amp (A), while FIG. 3B illustrates the magnetic flux path when a current supplied to coil 112 is at a higher current of 1.0 A. Device 100 may be operable to generate torque at between approximately 0.1 and 2.0 A, although more or less current may be supplied to device 100.

Shear areas of device 100 form at least four separate shear areas A-D, each area comprising at least two shear surfaces. As discussed above, by providing dual rotors 116 and a shaped stator 120 having a vertical portion 114 adjacent to one of the dual rotors 116 and coil 112, the magnetic flux path can pass through vertical portion 114 as the path of least resistance or "shorting path". As a result, vertical portion 114 may include a portion that is highly saturated or a "saturation zone", where the magnetic flux density is highest. It follows that the flux density in the saturation zone will increase as the current applied to coil 112 is increased. Accordingly, FIGS. 3A-3B illustrate this principle.

The flux density plot, designated 300 in FIG. 3A, illustrates a measurement of the flux density F across shear areas A-D, denoted via a vertical line $L_1$, of device 100 at a current of 0.1 A. Areas of higher density are depicted in plot 300 by a closer spacing of the flux lines, while a farther spacing of the flux lines depicts areas of lower density. For example, the saturation zone in vertical portion 114 of stator 120 includes the area of highest flux density. This is due to the fact that the saturation zone (as a result of the configuration of stator 120) offers the path of least resistance for the magnetic flux to flow through in stator 120, whereby the magnetic flux passing into at least one rotor 116 is limited until the saturation zone becomes fully saturated. More specifically, in plot 300, the configuration and disposition of stator 120 in relation to each of a bottom rotor 116A and a top rotor 116B results in limiting flux F that passes to top rotor 116B in comparison to bottom rotor 116A. This is illustrated by the fact that flux lines F are spaced closer together in bottom rotor 116A, while they are spaced farther apart in top rotor 116B.

In comparison, the flux density plot, designated 302 in FIG. 3B, illustrates a measurement of flux density F across shear areas A-D, denoted via a vertical line $L_1$, of device 100 at a current of 1.0 A. For example, the saturation zone in vertical portion 114 of stator 120 includes an even higher flux density than that measured in plot 300; the flux lines are even more closely spaced together such that the saturation zone is likely close to or at maximum saturation. As a result, the saturation zone may no longer effectively limit the magnetic flux passing into the top rotor 116B. This may be seen by the flux lines of the magnetic field in bottom rotor 116A, which are illustrated as even closer together, thus indicating that the flux density has increased in top rotor 116B, bringing the flux density closer to that of bottom rotor 116A, and thereby increasing torque of device 100 proportionally.

Figure 4A:
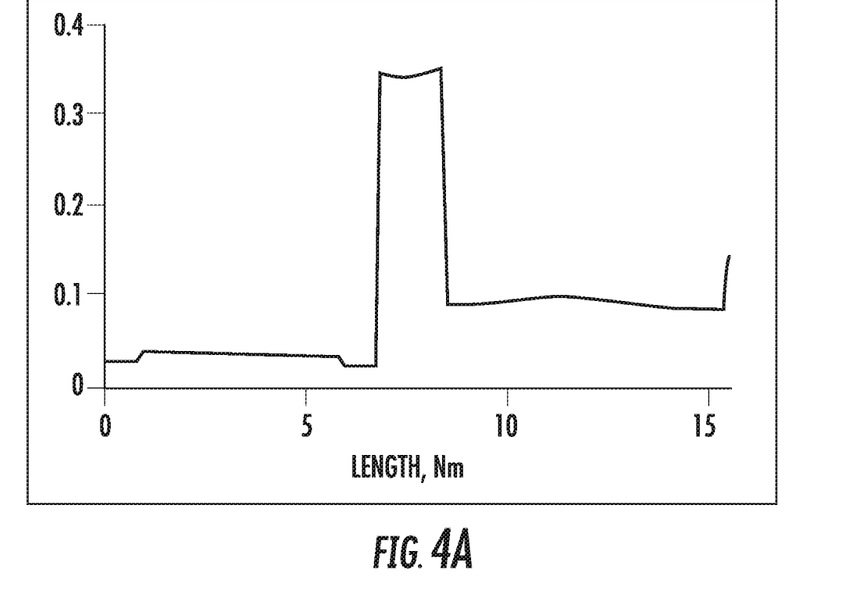
FIGS. 4A-4C are graphical illustrations of the flux density at increasing current levels associated with a dual rotor torque generating device or system according to one embodiment of the present subject matter.
Figure 4B:
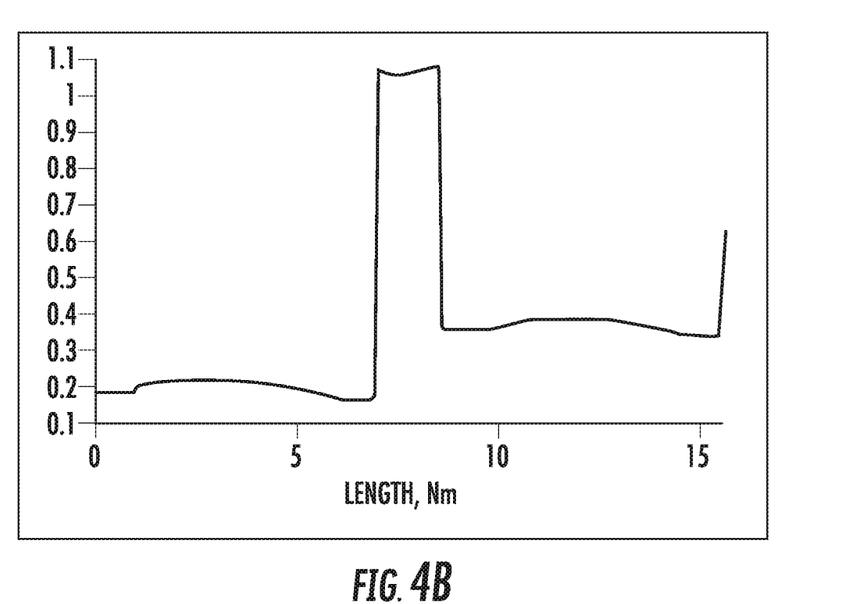
Figure 4C:
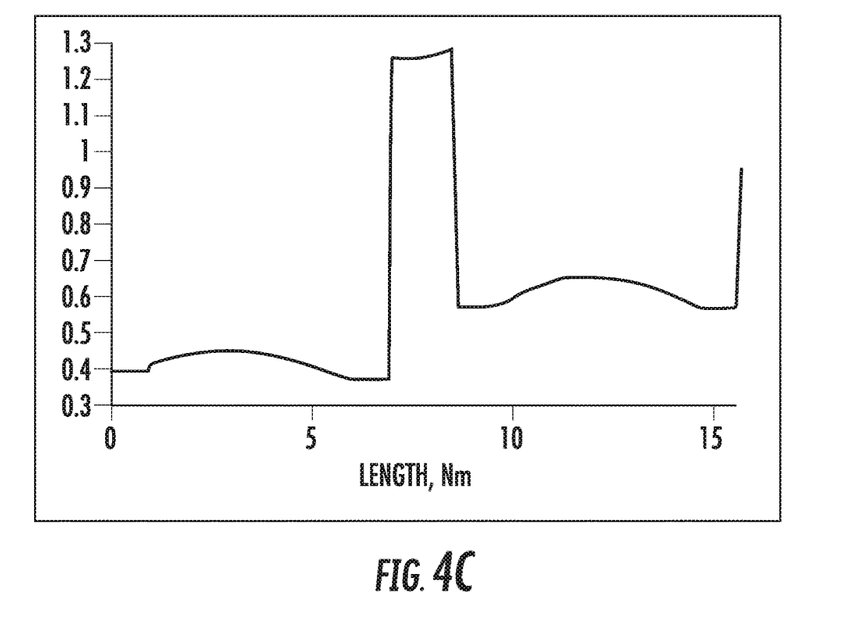

FIGS. 4A-4C illustrate the flux density across four shear areas A-D, as denoted by vertical line $L_1$ in FIGS. 3A-3B, with increasing current applied to coil 112. As may be seen in FIGS. 4A-4C, increasing the current applied to coil 112 increases the flux density measured across four shear areas A-D.

Figure 5:
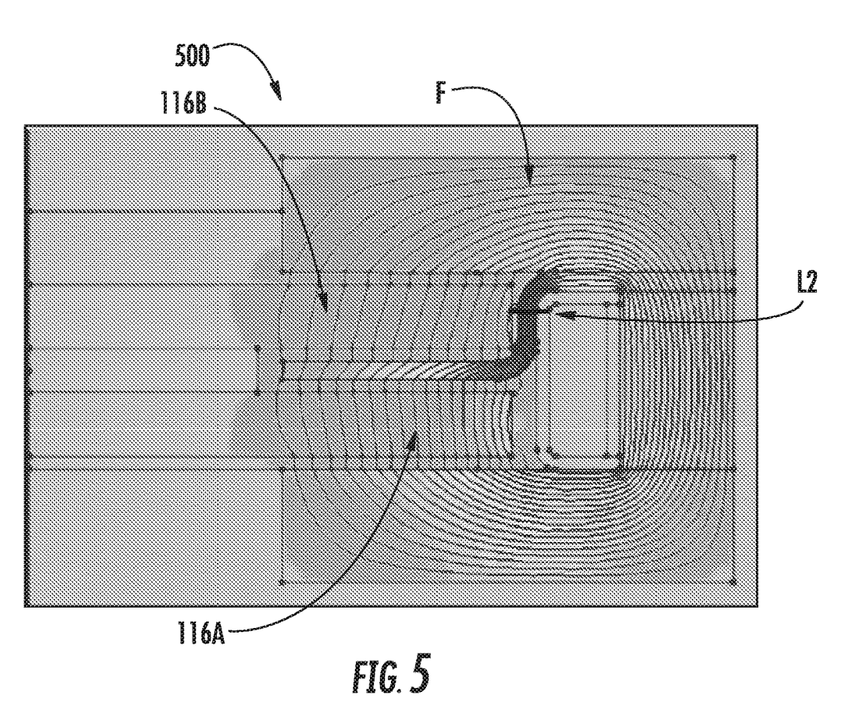
FIG. 5 is a flux density plot at various current levels associated with a dual rotor torque generating device or system according to a further embodiment of the present subject matter.

FIG. 5, generally designated 500, schematically illustrates the magnetic flux path through a "stator saturation zone" generally identified by horizontal line $L_2$. The illustration in FIG. 5 represents device 100, illustrated in FIGS. 1A-1B, after coil 112 is energized by a 1.0 amp (A) current. Notably, the stator saturation zone has a saturation point, at which the zone may be completely saturated. Once the saturation zone reaches this point, the saturation zone of stator 120 may no longer limit magnetic flux F that passes through to top rotor 116B. In FIG. 5, the saturation zone is indicated as being totally saturated across an entirety of the zone, which is illustrated by flux lines being very closely spaced together. Thus, magnetic flux F will not be limited by the saturation zone and may pass into top rotor 116B, thereby increasing torque of device 100 proportionally.

Figure 6A:
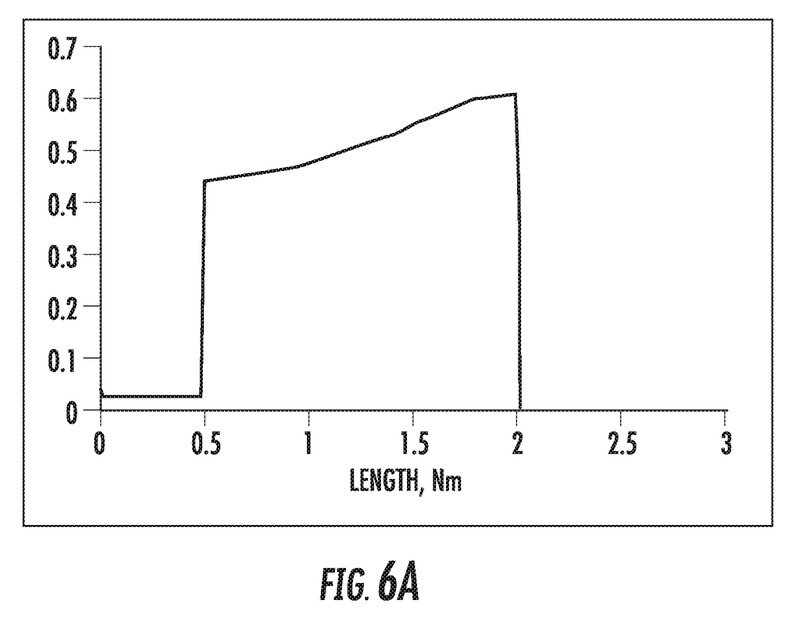
FIGS. 6A-6C are graphical illustrations of the flux density at increasing current levels associated with a dual rotor torque generating device according to a further embodiment of the present subject matter.
Figure 6B:
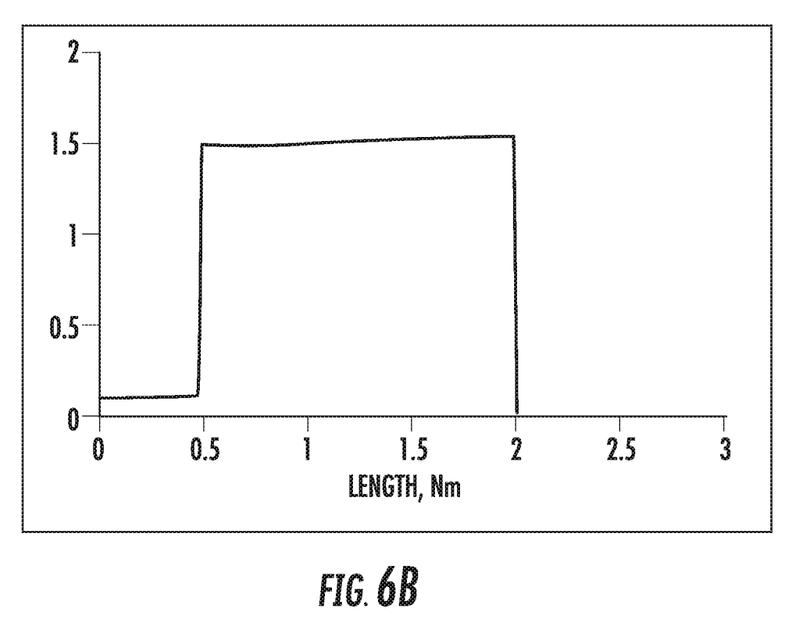
Figure 6C:
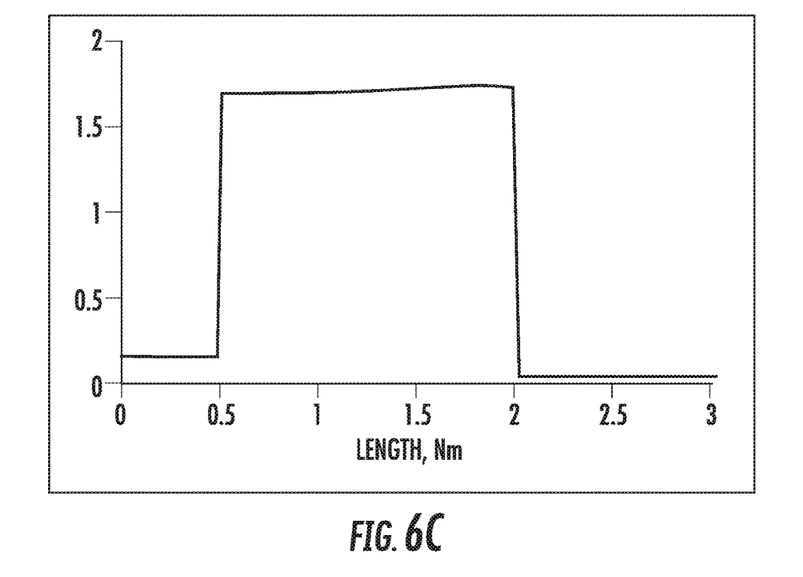

FIGS. 6A-6C illustrate the flux density across the saturation zone of stator 120, as denoted by horizontal line $L_2$ in FIG. 5, with increasing current applied to coil 112. As may be seen in FIGS. 6A to 6C, increasing the current applied to coil 112 increases the flux density across the saturation zone, such that the entirety of the zone may become saturated upon the current reaching 1.0 A (see, e.g., FIG. 6C). If a current higher than 1.0 A were to be applied to coil 112, a flux density of the saturation zone may not increase and the magnetic flux passing through top rotor 116B would not be limited by the saturation zone. Where more than two rotors 116 and/or more than one stator 120 is used, higher currents (e.g., >1.0 A) may be applied to devices and/or systems described herein for generating even higher torque.

Figure 7:
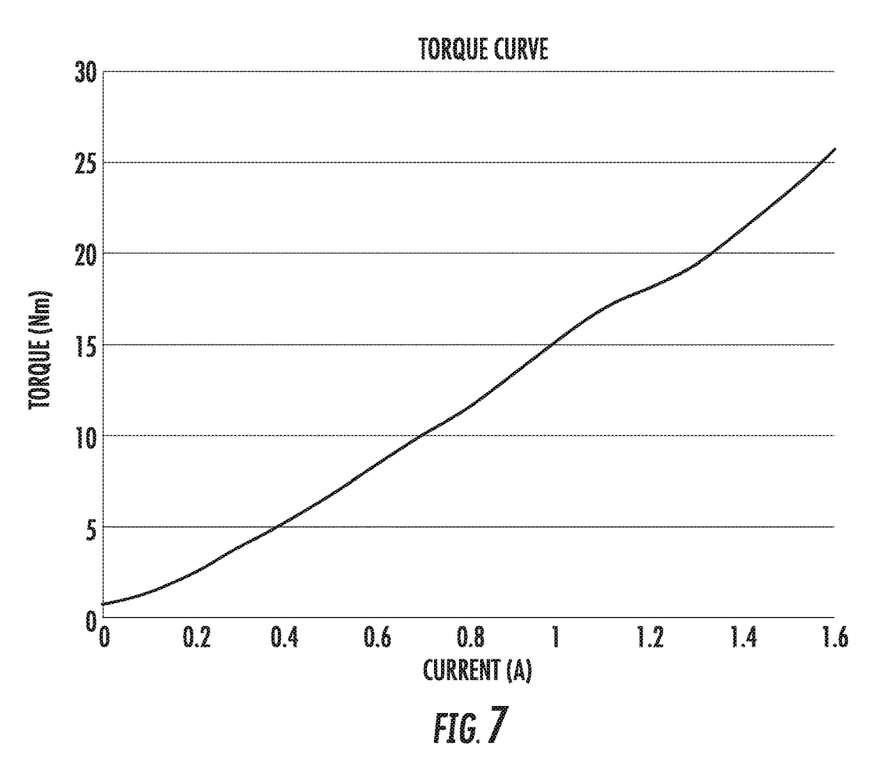
FIG. 7 is a graphical illustration of torque versus current for a dual rotor torque generating device or system according to one embodiment of the present subject matter.

Referring to FIG. 7, a torque plot associated with a torque generating device, e.g., device 100 of FIGS. 1A and 1B, is shown, where the measured torque follows a proportionally linear torque curve, similar to traditional, single rotor designs. As stator 120 saturates, more flux F is passed through top rotor 116B, increasing the amount of torque generated proportionally. In one embodiment, device 100 may be configured to generate between 2 and 30 Nm of torque as between 0.1 and 2.0 A of current are applied to coil 112.

Figure 8:
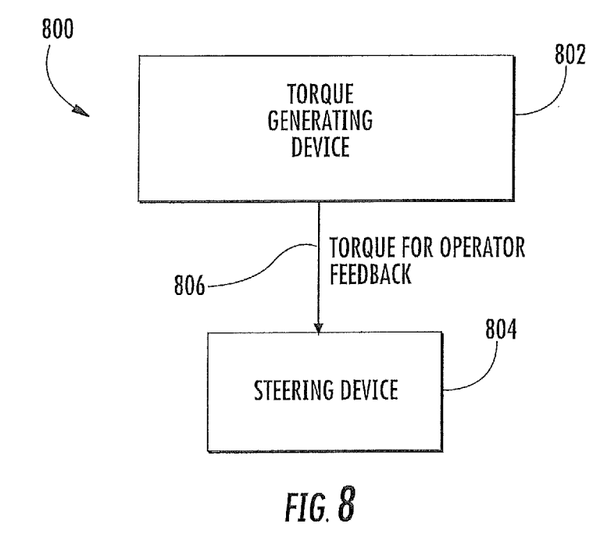
FIG. 8 is a schematic block diagram of an exemplary dual rotor torque generating system according to one embodiment of the present subject matter.

FIG. 8 is a block diagram of one exemplary system, generally designated 800, for generating torque via a dual rotor torque generating device 802 connected to a steering device 804 via a shaft 806. For example, where torque generating device 802 is implemented in a brake system, the design may be of the caliper brake variety. In some embodiments, system 800 includes a steer-by-wire system in which a vehicle or equipment operator uses steering device 804 for steering drive wheels of a vehicle or piece of machinery and/or equipment.

Torque generating device 802 may include a dual rotor torque generating device 100 or 200, as previously described. Steering device 804 may include a steering wheel, handle, etc. by which an operator steers a vehicle, machine, and/or equipment. In some embodiments, torque generating device 802 physically may connect to steering device 804 via shaft 806 (e.g., shaft 104, FIGS. 1A and 1B). In response to an operator turning, rotating, or moving steering device 804, device 802 may generate a variable torque. Device 802 may generate an increased variable torque (in comparison to single rotor designs) by creating a resistance across four shear areas A-D through MR material via an energized coil 112. Device 802 utilizes at least two rotors 116 and a one piece shaped and/or formed non-linear stator 120 configuration that provides not only, two additional shear areas, but also a shorting path for magnetic flux F to flow through; thus, limiting magnetic flux F passing to one of the two rotors 116 until the shorting path becomes saturated. Upon saturation of the shorting path, magnetic flux F may pass to the one rotor (e.g., top rotor 116B) without being limited by the shorting path, such that torque will continue increasing proportionally.

In some embodiments, stator 120 may be fixedly held between portions of housing 102 via non-ferrous connection and/or clamped between one of the top and bottom poles 108 and side pole 110. In one embodiment, torque generating device 100 further comprises a first stator 120 having a non-linear cross-section and/or is magnetically responsive. In some embodiments, first stator 120 comprises a one-piece "s" shape and is shaped and/or formed around coil 112.

In some embodiments, a path of least resistance is generated in a vertical portion of first stator 120, such that magnetic flux F passing through the path of least resistance and into one of at least two rotors 116 is limited until the vertical portion 114 becomes saturated. Likewise, in some embodiments, a stator saturation zone is located in the vertical portion 114 of first stator 120, which corresponds to an area wherein a flux density of magnetic flux F is highest.

In some embodiments, the magnetic field is generated between coil 112 and an outer circumference of housing 102.

In one embodiment, torque generating device 100 comprises at least two rotors 116 that are magnetically responsive. In some embodiments, torque generating device 100 comprises additional rotors 116 and/or stators 120. For example, device 100 comprises at least three rotors 116 and at least a first stator 120 and a second stator 120 vertically stacked within the housing 102.

In some embodiments, device 100 may comprise four shear areas having two shear surfaces each. For example, a first shear area A may be formed between a surface of a top pole 108B and a first surface of a top rotor 116B, a second shear area B may be formed between a first surface of stator 120 and a second, opposing surface of the top rotor 116B, a third shear area C may be formed between a second, opposing surface of stator 120 and a first surface of a bottom rotor 116A, and a fourth shear area D may be formed between a surface of a bottom pole 108A and a second, opposing surface of bottom rotor 116A. In such an example, MR material may be disposed proximate to the first, second, third, and fourth shear areas A-D.

In some embodiments, MR material comprises at least one of an MR powder or an MR fluid.

Figure 9:
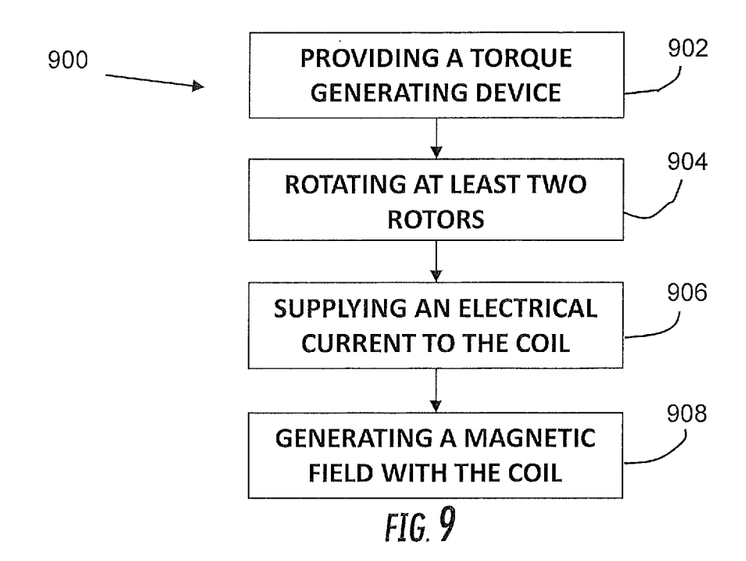
FIG. 9 is a flow diagram of an exemplary method of generating torque according to one embodiment of the present subject matter.

FIG. 9 is an exemplary flow diagram of a method, generally designated 900, of generating torque. Method 900 comprises providing a torque generating device 100.

In some embodiments, device 100 provided by method 900 may comprise a housing 102, a shaft 104 supported by bearings 111, at least one top pole and one bottom pole 108, at least one side pole 110, at least two rotors 116 configured to rotate within housing 102, at least a first stator 120 disposed between at least two rotors 116, MR material disposed within housing 102 and at least partially surrounding stator 120 and at least two rotors 116, and a coil 112 configured to generate a magnetic field. The amount of torque generated by the torque generating device 100 increases in proportion to the amount of electrical current supplied to the coil 112.

In step 902, the step includes providing a torque generating device 100 having at least a housing 102, at least two rotors 116, at least one stator 120, a coil 112, and a magnetically responsive (MR) material disposed within the housing 102 and at least partially surrounding the at least one stator 120 and the at least two rotors 116.

In step 904, the step includes rotating at least two rotors 116. The at least two rotors 116 are rotated by the shaft 104 in order to generate torque. In some embodiments, an amount of torque generated by torque generating device 100 may increase in proportion to an amount of electrical current supplied to coil 112. For example, device 100 may be operable to generate between approximately 0 and 30 Newton-meters (Nm) of torque.

In step 906, the step includes supplying an electrical current to coil 112. Coil 112 is in communication with an electrical unit (not shown) that may include one or more sensors, power amplifiers, signal conditioners, analog or digital circuitry for employing control algorithms, communications circuitry, as well as other circuitry and like components, that may be configured to determine an electrical current to supply to coil 112 based on rotation of at least two rotors 116. For example, device 100 (i.e., coil 112) may receive between approximately 0 A and 2 A of current.

In step 908, the step includes generating a magnetic field with the coil, thereby generating a variable torque for opposing rotation of the at least two rotors within the housing, wherein an amount of torque generated by the torque generating device increases in proportion to the quantity of the electrical current supplied to the coil. That is, the magnetic field that generates a variable torque for opposing rotation of at least two rotors 116 within housing 102 is generated by coil 112. In some embodiments, coil 112 is supplied current to thereby generate and convey a magnetic field or flux path through MR material. For example, the magnetic field is generated between coil 112 and an outer circumference of housing 102.

It will be appreciated that exemplary process 900 is for illustrative purposes and that different and/or additional actions may be used. It will also be appreciated that various actions described herein may occur in a different order or sequence.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. A torque generating device comprising:
   a housing;
   a shaft;
   at least one bearing;
   at least one top pole;
   at least one bottom pole;
   at least one side pole;
   at least two rotors configured to rotate within the housing;
   at least a first stator disposed between the at least two rotors, wherein at least a portion of the first stator is disposed between a portion of the at least one side pole and one of the at least one top pole or the at least one bottom pole;

a magnetically responsive (MR) material disposed within the housing and at least partially surrounding the first stator and the at least two rotors; and a coil configured to generate a magnetic field, wherein at least the first stator has vertical portion adjacent to at least one of the two rotors and is configured to allow a magnetic field to pass through the vertical portion thereby providing a shorting path, wherein an amount of torque generated by the torque generating device increases in proportion to an amount of electrical current supplied to the coil.

2. The torque generating device of claim 1, wherein the first stator has a non-linear cross-section.

3. The torque generating device of claim 2, wherein a path of least resistance is generated in the non-linear vertical portion of the first stator, such that magnetic flux passing through the path of least resistance and into one of the at least two rotors is limited until the vertical portion becomes saturated.

4. The torque generating device of claim 3, wherein a stator saturation zone is located in the non-linear vertical portion of the first stator, which corresponds to an area wherein a flux density of a magnetic flux is highest.

5. The torque generating device of claim 1, wherein the first stator is magnetically responsive.

6. The torque generating device of claim 1, wherein the torque generating device is operable to generate between approximately 0 and 30 Newton-meters (Nm) of torque.

7. The torque generating device of claim 1, wherein the torque generating device is operable to generate torque at between approximately 0 Amps (A) and 2 A of current.

8. The torque generating device of claim 1, wherein the at least two rotors are magnetically responsive.

9. The torque generating device of claim 1, wherein the first stator is clamped between one of the at least the one top and one bottom pole and the at least one side pole.

10. The torque generating device of claim 1, wherein the first stator comprises a one-piece s-shape cross-section and is shaped around the coil.

11. The torque generating device of claim 1, further comprising at least four shear areas that include: a first shear area formed between a surface of a top pole and a first surface of a top rotor, a second shear area formed between a first surface of the first stator and a second, opposing surface of the top rotor, a third shear area formed between a second, opposing surface of the first stator and a first surface of a bottom rotor, and a fourth shear area formed between a surface of a bottom pole and a second, opposing surface of the bottom rotor.

12. The torque generating device of claim 11, wherein the MR material is disposed proximate to the first, second, third, and fourth shear areas.

13. The torque generating device of claim 1, wherein the MR material comprises at least one of an MR powder and an MR fluid.

14. The torque generating device of claim 1, further comprising at least three rotors and at least a first and a second stator vertically stacked within the housing.

15. The torque generating device of claim 1, wherein the magnetic field is generated within the coil and completes a circuit between the top pole, the side pole, the bottom pole, the first rotor, the stator, the second rotor, and the MR material.

16. The torque generating device of claim 1 wherein the torque generating device is a steering device configured to provide tactile feedback to an operator of the steering device.

17. The torque generating device of claim 16, wherein the steering device further comprises a shaft, the shaft providing a steering input to a mechanical system capable of being steered.

18. The torque generating device of claim 1, wherein the magnetic field is generated within the coil and completes a circuit between the top pole, the side pole, the bottom pole, the first rotor, the stator, the second rotor, and the MR material.

* * * * *